United States Patent [19]

Maguire

[11] Patent Number: 5,054,801
[45] Date of Patent: Oct. 8, 1991

[54] BICYCLE WITH BELT DRIVE

[76] Inventor: Lowell L. Maguire, 836 M St., Anchorage, Ak. 99501

[21] Appl. No.: 493,616

[22] Filed: Mar. 15, 1990

Related U.S. Application Data

[63] Continuation-in-part of Ser. No. 250,444, Sep. 28, 1988, Pat. No. 4,909,529.

[51] Int. Cl.[5] .............................................. B62M 1/02
[52] U.S. Cl. ...................................... 280/261; 474/56
[58] Field of Search ....................... 280/236, 238, 261; 74/318, 319; 474/49, 50, 56, 57, 53

[56] References Cited

U.S. PATENT DOCUMENTS

| | | | |
|---|---|---|---|
| 672,962 | 4/1901 | Seymour | 474/56 |
| 4,030,373 | 6/1977 | Leonard | 474/53 |
| 4,530,676 | 7/1985 | Leonard | 474/53 |
| 4,820,244 | 4/1989 | Lander | 474/56 |

*Primary Examiner*—Andres Kashnikow
*Assistant Examiner*—Richard M. Camby
*Attorney, Agent, or Firm*—William D. Hall

[57] ABSTRACT

A belt drive for bicycles with a drive pulley rotated by the pedals of the bicycle and a driven pulley for driving the rear wheels of the bicycle. A V-belt connects the pulleys. Each pulley is made in sections with each section being an arc of a circle. These sections in collapsed position form a circle. The sections of each pulley may be moved outward to provide a larger diameter. A plate rotates in frictional contact with each pulley. To change the gear ratio a brake is applied against the friction plate to cause relative motion between the pulley and the complimentary friction plate.

8 Claims, 8 Drawing Sheets

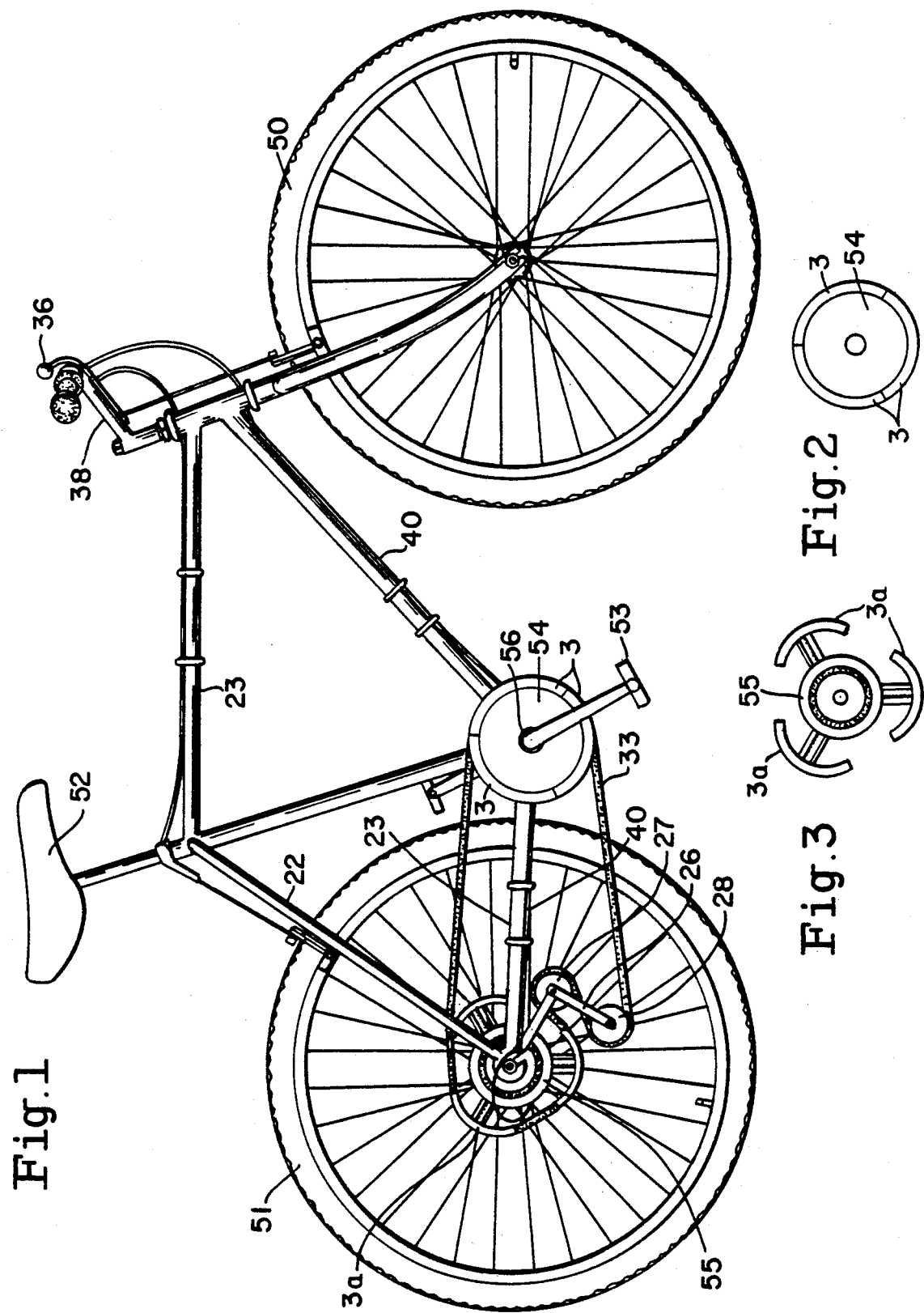

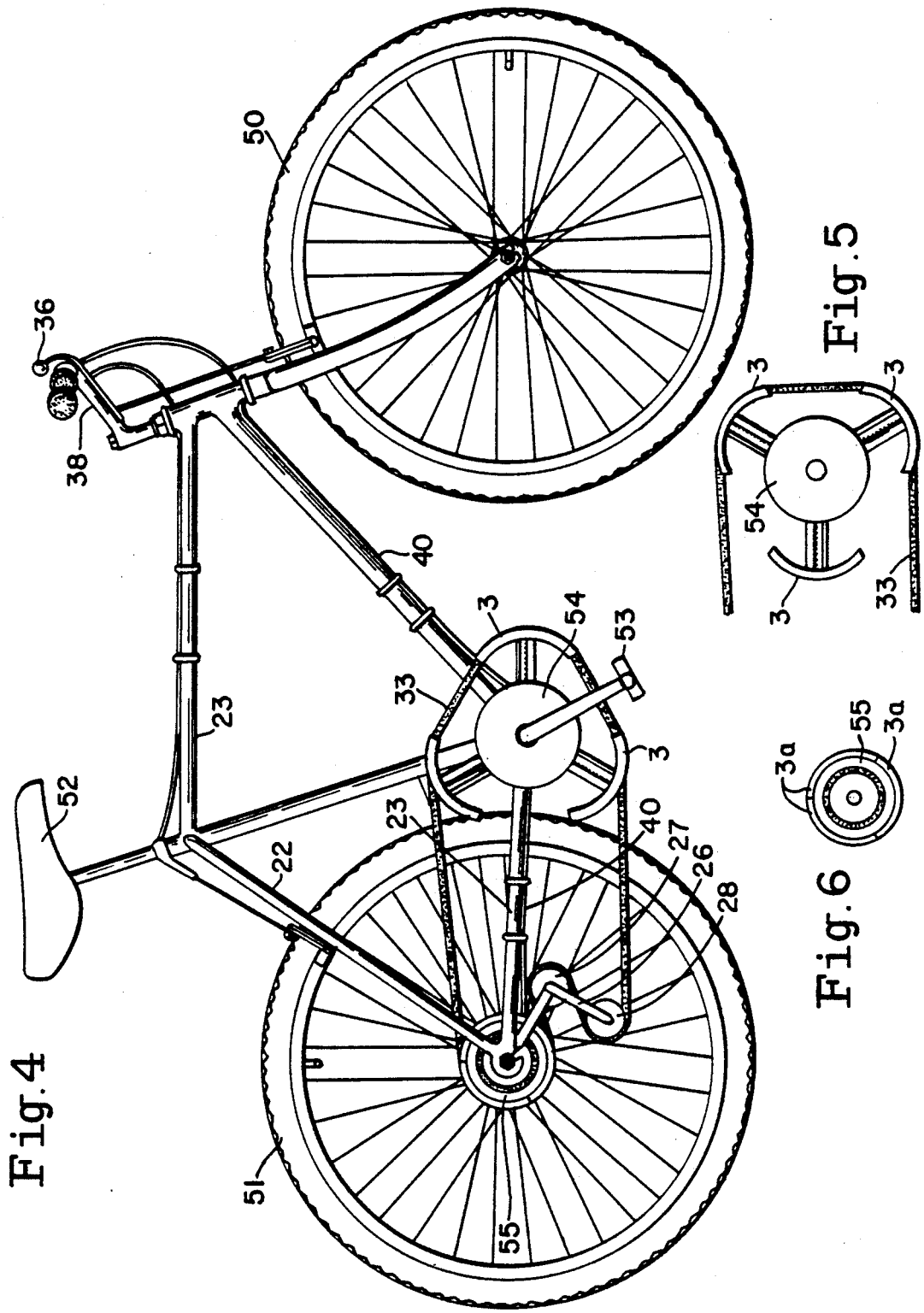

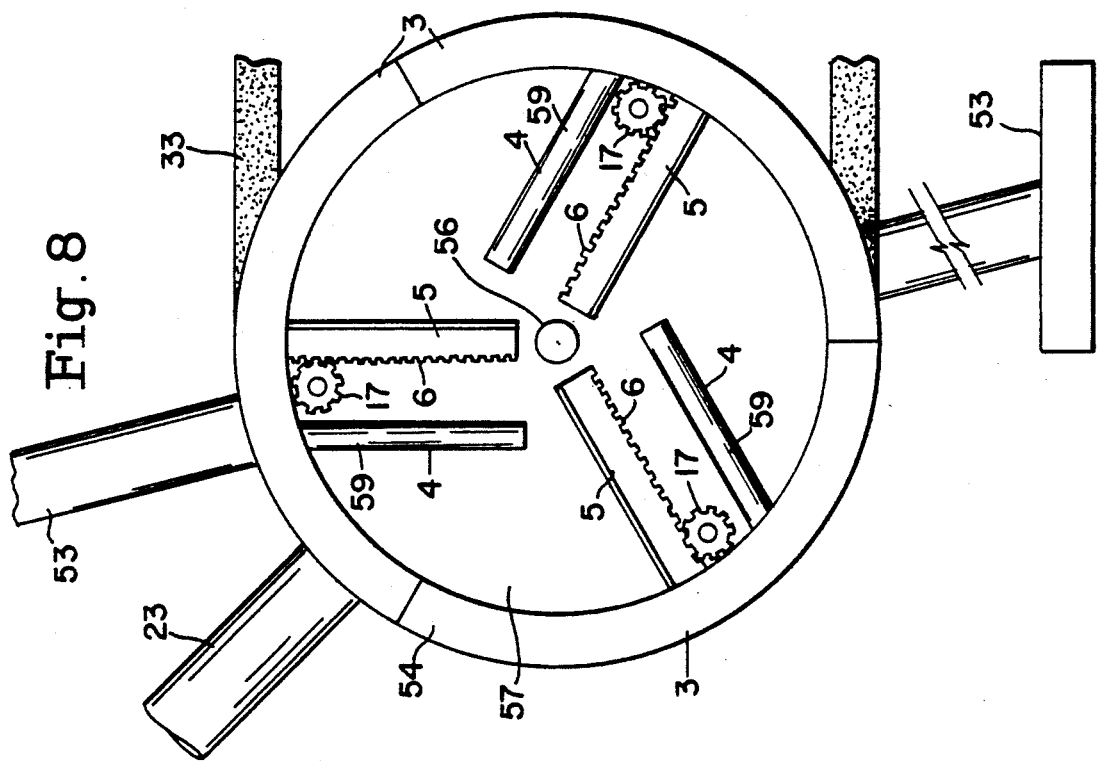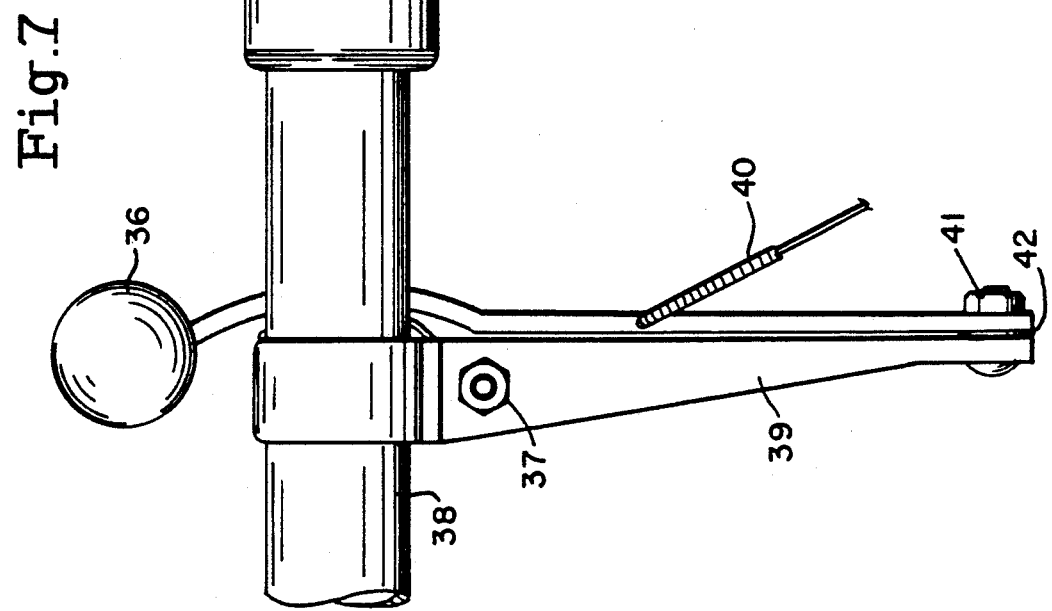

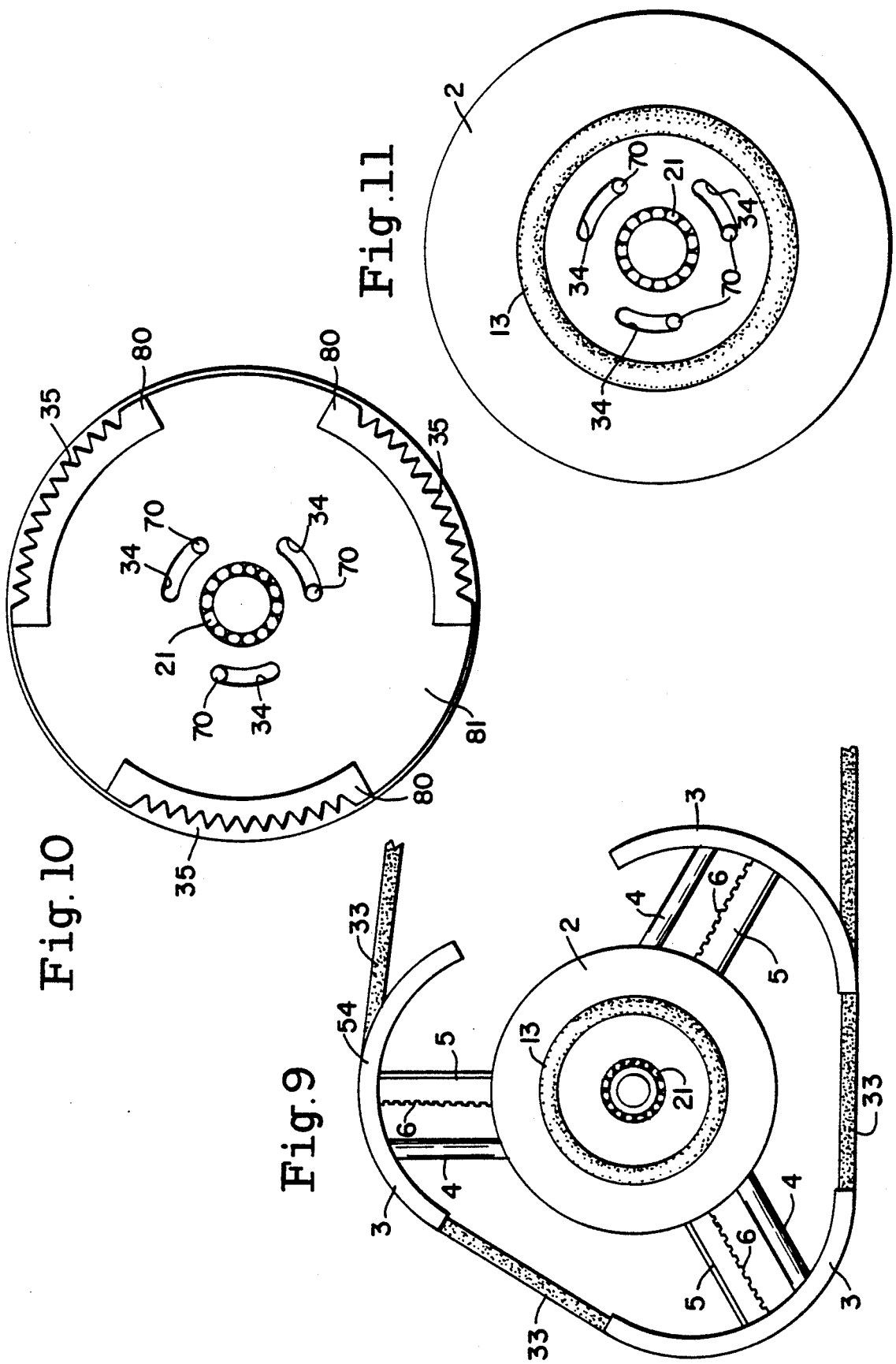

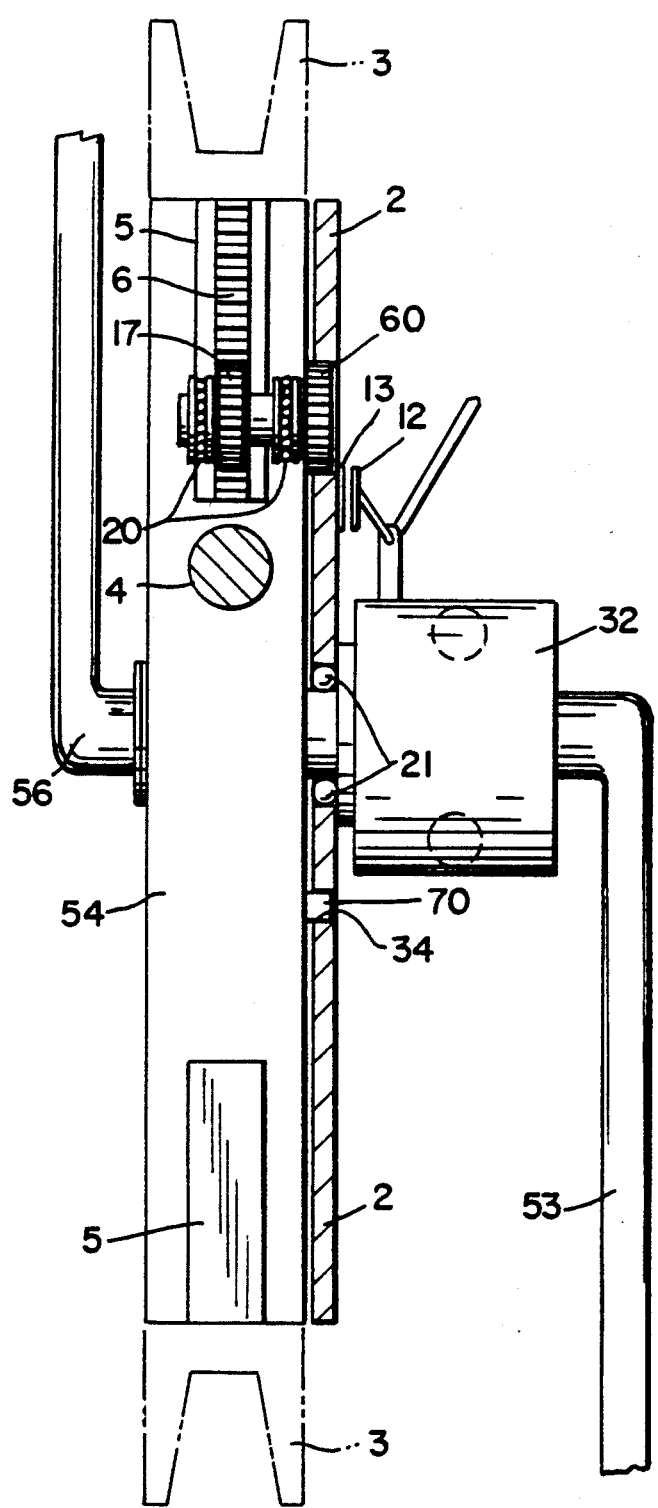
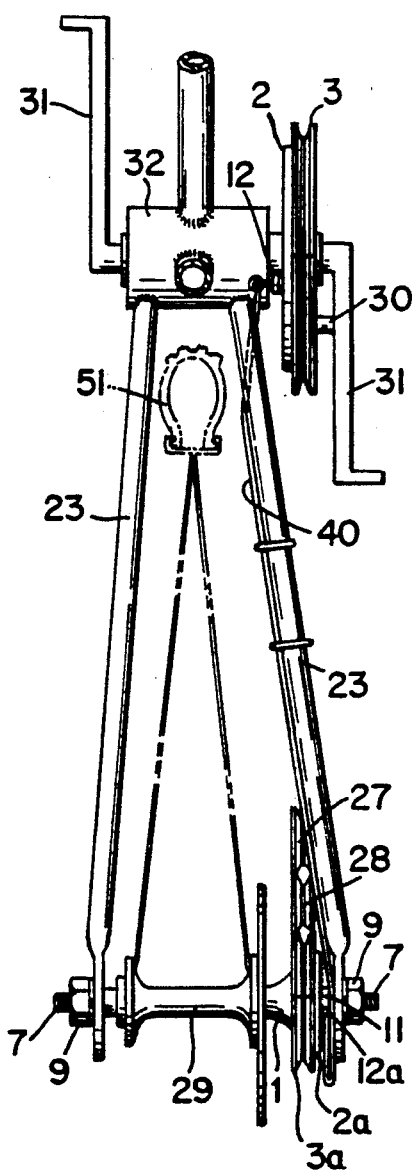
Fig.12
Fig.15

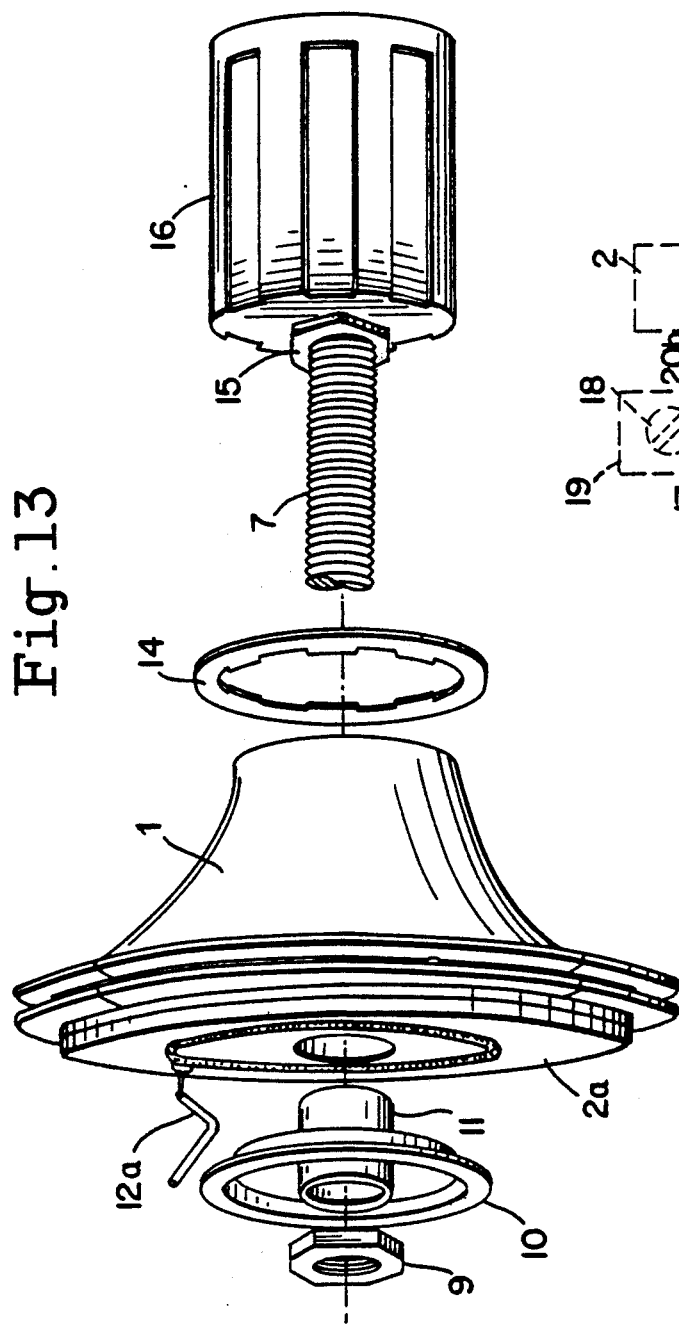
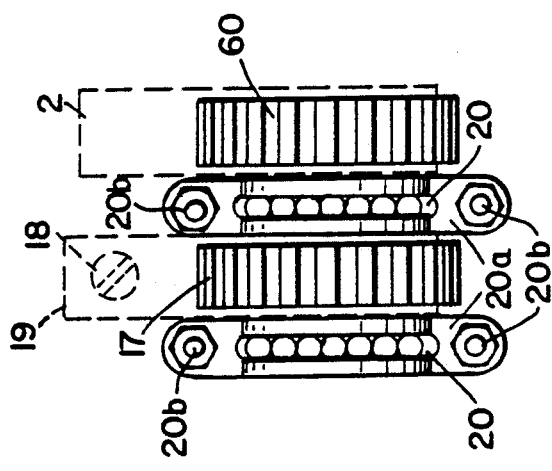

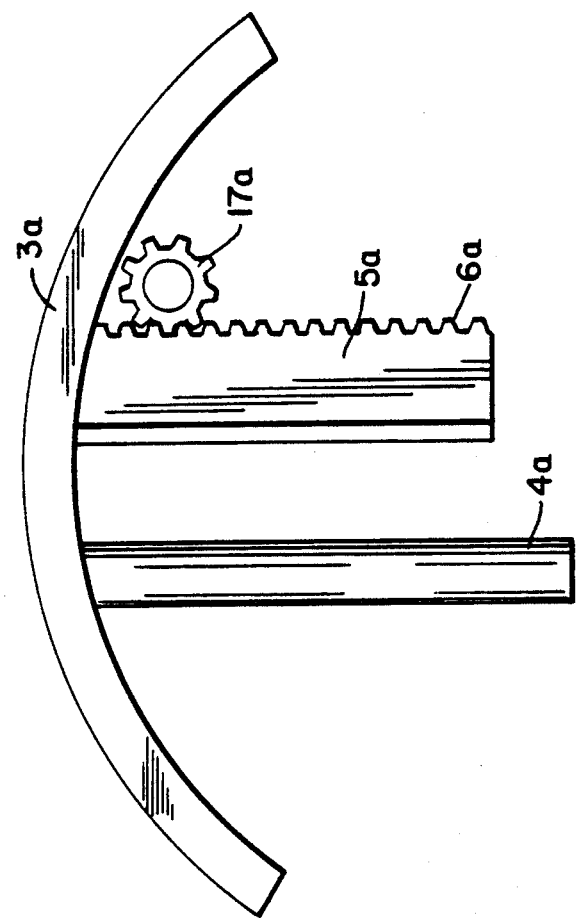
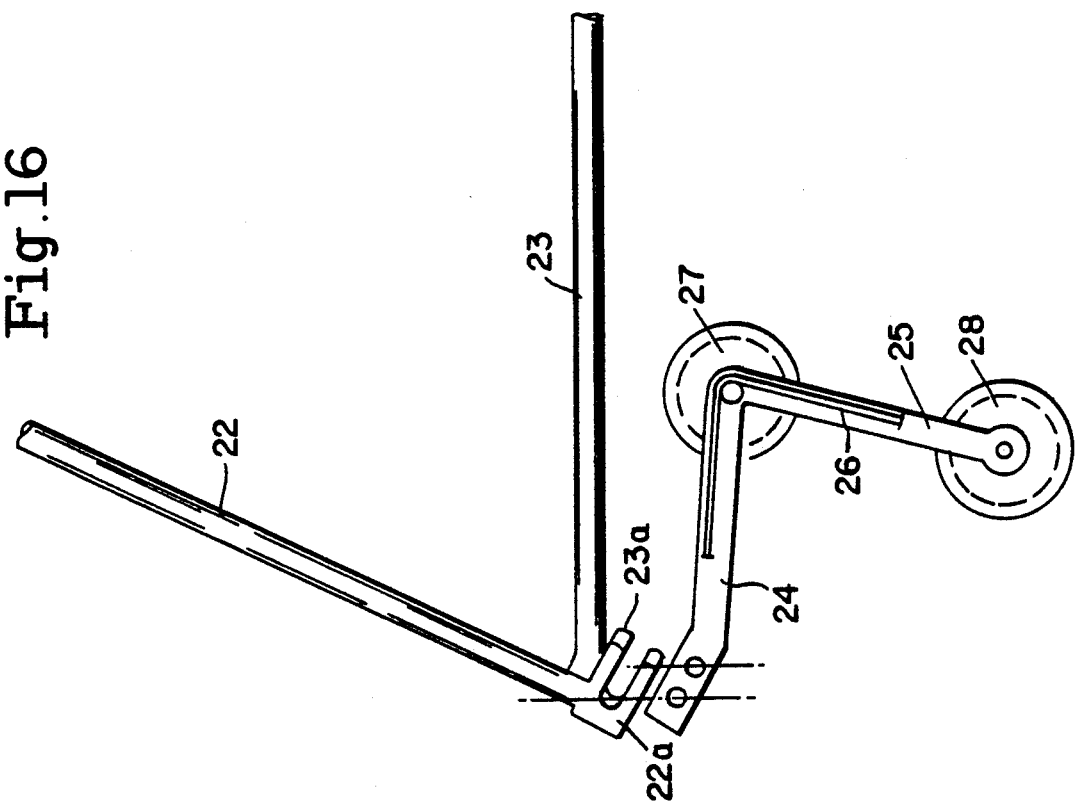

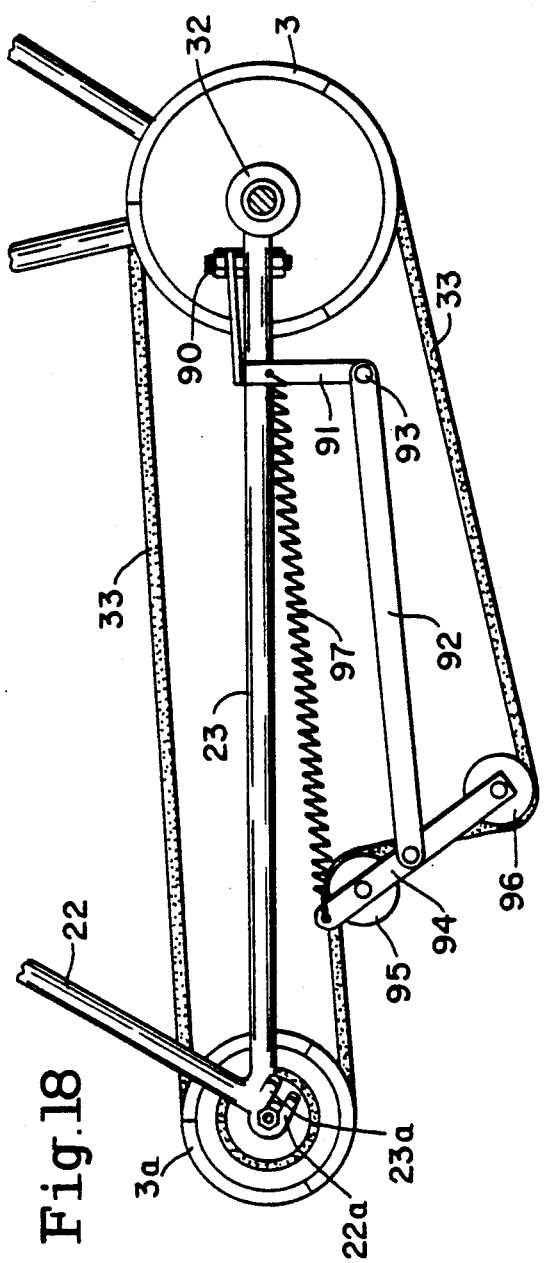
Fig.18
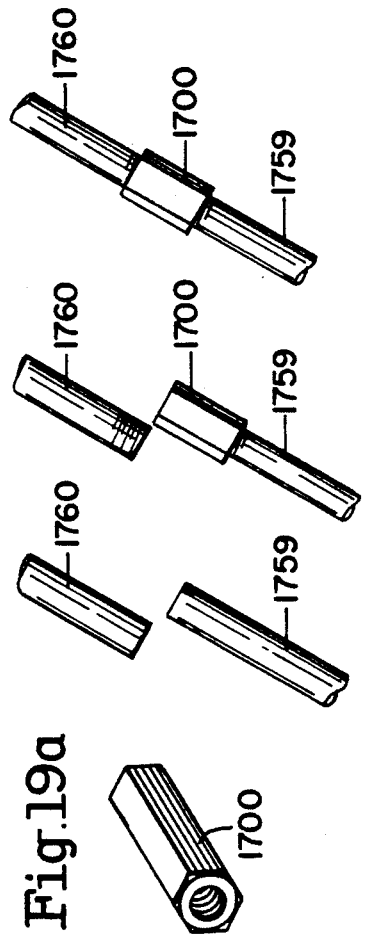
Fig.19b Fig.19c Fig.19d
Fig.19a
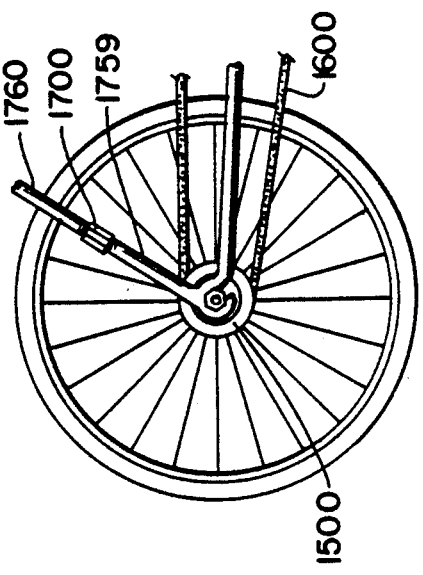
Fig.19

BICYCLE WITH BELT DRIVE

RELATED APPLICATION

This application is a continuation-in-part of each of my prior copending applications Ser. No. 07/250,444, filed Sept. 28, 1988, now issued U.S. Pat. No. 4,909,529, Mar. 20, 1990 entitled Belt Drive Systems for Bicycles and PCT 89/04172, filed Sept. 26, 1989, and entitled Belt Drive Systems for Bicycles.

BACKGROUND OF THE INVENTION

Bicycles with a belt drive instead of a chain drive are well known. For example, U.S. Pat. No. 4,119,326 to John F. Porter issued Oct. 10, 1978, and entitled Variable Speed Bicycle, teaches a bicycle power train comprising variable speed pulleys and a belt. This patent has a single raceway for the pulley driven by the pedals and a single raceway for the driven pulley that rotates with the rear wheel. The widths of these raceways vary in order to change the speed of the bicycle.

SUMMARY OF THE INVENTION

The invention provides a belt drive for bicycles with a drive pulley rotated by the pedals of the bicycle and a driven pulley for driving the rear wheels of the bicycle. A V-belt connects the pulleys. Each pulley is made in sections with each section being an arc of a circle. These sections, in a collapsed position, form a circle. The sections of each pulley may be moved outwardly to provide a larger diameter.

The pulleys are arranged so that when the sections of one pulley have been drawn inwardly to form a circle the sections of the other pulley are fully extended, and as the sections of either pulley move (inwardly or outwardly) the sections of the other pulley move in the opposite direction (outwardly or inwardly).

A plate rotates in frictional contact with each pulley. To change the transmission ratio (the ratio of the diameters of the two pulleys) while the rider is rotating the pedals, a brake is applied to each friction plate which causes it to lag (slip) relative to its complementary pulley. The relative motion, between the pulley and its complementary friction plate, rotates gears which move the sections outwardly or inwardly, as the case may be.

An arrangement for maintaining the belt tight is also disclosed. Two pulleys one pressing against the inner side of the belt and one pressing against the outer side of the belt removes any slack from the belt.

BRIEF DESCRIPTION OF THE DRAWINGS

FIG. 1 is a side view of a bicycle embodying the invention where the smallest transmission ratio is employed.

FIG. 2 shows the shape of the driving pulley of FIG. 1.

FIG. 3 shows the shape of the driven pulley of FIG. 1.

FIG. 4 is a side view of the bicycle of FIG. 1 where the largest transmission ratio is employed.

FIG. 5 shows the shape of the driving pulley of FIG. 4.

FIG. 6 shows the shape of the driven pulley of FIG. 4.

FIG. 7 shows a control device 36, for changing the transmission ratio, attached to a handle bar 38 of the bicycle.

FIG. 8 is a side view of the driving pulley, of FIG. 1, with its sections contracted.

FIG. 9 is a side view of the driving pulley and friction plate, with its sections expanded.

FIG. 10 is a side view of the side of the friction plate that cooperates with the driving pulley of FIGS. 2, 5, 8 and 9.

FIG. 11 is a side view of the side of the friction plate that cooperates with the driving pulley of FIGS. 2, 5, 8 and 9.

FIG. 12 is a front end view of the driving pulley of FIGS. 2, 5, 6 and 8 and the friction plate of FIGS. 10 and 11.

FIG. 13 is an exploded view of the driven pulley of FIGS. 3 and 6, the friction plate that cooperates with the driven pulley, a freewheeling device and other parts.

FIG. 14 is a front view of the gear system which transforms relative motion of the friction plate 2 and the driving pulley 54 into rotary motion of pinion 17.

FIG. 15 is a top view of the drive system of the bicycle.

FIG. 16 is a side view of the slack adjuster for the belt.

FIG. 17 is a side view of the rack and pinion arrangement for the driven pulley.

FIG. 18 is a modified form of slack adjuster.

FIGS. 19, 19A, 19B, 19C and 19D show a modified form of frame member which permits the belt to be easily changed.

DETAILED DESCRIPTION OF THE INVENTION

FIGS. 1 to 3 show a typical bicycle having front and rear wheels 50, 51, respectively, a frame 22, 23, handlebars 38, a seat 52, and pedals 53.

The pedals 53 rotate a driving pulley 54 having three sections 3 and a driven pulley 55 having three sections 3a. The drive and driven pulleys are of similar construction but need not have the same diameter. Normally, the driving pulley 54 will have larger diameter, when fully collapsed, than the driven pulley 55 when fully collapsed.

In FIG. 1, the driving pulley 54 is fully collapsed and the driven pulley 55 is fully expanded, giving the lowest transmission ratio. In FIG. 4, the driving pulley 55 is fully expanded and the driven pulley 55 is fully collapsed giving the highest transmission ratio.

The transmission ratio is controlled by a control cable 40 (FIG. 7) as more fully explained later. The control cable 40 is operated by a manual control 36, movable toward and away from the driver, and rotatable about bolt 41, which is carried by arm 39 which is supported on handlebar 38 by a strap that is closed under tension by bolt and nut 37.

A typical driving pulley as shown in FIG. 8 is fixed to the rotatable shaft 56 (FIGS. 1, 12), which is rotated by pedals 53. The driving pulley 54 has a base 57 that rotates with, and is fixed to, shaft 56. Mounted on the base 57 for movement radially outward are three racks 5 each having teeth 6. Suitable guides (not shown), on base 57, insure that racks 5 move inwardly and outwardly along a radius of base 57. Each section 3 is mounted on, and carried by, the outer end of its complementary rack 5. Each rack 5 is moved outwardly and inward by a pinion or gear 17 which has a shaft extending through a hole in base 57. Each section 3 also has a guide 4 which tends to guide and stabilize the section 3.

Each guide 4 moves in a hole 59 in base 57 so as to control the path of movement of guide 4. When the three pinions 17 drive the three racks 5, 6 outward as far as possible, the sections 3 of the driving pulley 54 have the positions shown in FIGS. 5 and 9.

A friction plate 2 (FIGS. 10, 11, 12) has one face 81 in frictional contact with the base 57 of driving pulley 54. The friction plate 2 is mounted on a bearing 21 which permits it to rotate relative to shaft 56, but since face 81 of friction plate 2 is held into substantial frictional contact with the base 57 of the driving pulley 54, the plate 2 is rotated by, and synchronously with, pulley 54 except when brake 12 is applied to the brake surface 13 of plate 2. The plate 2 has cut-out portions 80 so as to expose teeth 35 of three sun gears.

Pins 70 mounted on the driving pulley base 57 pass through slots 34 in the friction plate 2. These pins 70 limit the relative angular motion of the friction plate 2 and the driving pulley 54.

Assume that the rider is pedaling his bicycle and he moves the control 36 to shift to a lower transmission ratio, the control cable 40 moves brake 12 (FIG. 12) into contact with brake surface 13 slowing the friction plate 2, relative to the speed of driven pulley 54, and causing gear teeth 35 to rotate the pinions 60, 17 to drive the three racks 5, 6 outward, as follows. FIG. 14 illustrates a typical mechanism for transforming relative motion between friction plate 2 and driving pulley base 57 into rotation of pinion 17. Pinion 17 and gear 60 are on a common shaft and rotate on bearings 20. The bearings 20 are supported by support member 20a that is bolted by bolts 20b to base 57 of the driving pulley 54. The gear 60 meshes with teeth 35 of the sun gear 35 on friction plate 2. Thus, when the relative angular positions of friction plate 2 and base 57 change, the sun gear 35 rotates gear 60 which in turn rotates pinion 17 which in turn moves racks 5, 6.

FIG. 13 shows the driven pulley 55 at the rear wheel 51. The friction disc 2a is in frictional contact with the driven pulley 55. The friction disc 2a which contacts the driven pulley is identical with the friction disc 2a for the driving pulley 54. The driven pulley 55 is identical with the driving pulley 54 (FIG. 8), except that the teeth 6a are on the other sides of the racks 5a and so are the pinions 17a, as shown in FIG. 17 for example. As a result of repositioning the teeth 6a and the pinions 17a on the opposite sides of all three racks 5a, the pinions 17a on the driven pulley 55 will always drive their racks 5a in the opposite direction from the direction that the racks 5 of the driving pulley 54 are driven. As a result, when the control knob 36 is operated while the rider is pedaling forward, the sections 3 of driving pulley 54 move outwardly while the sections 3a of driven pulley 55 move inward. The sections 3a have guides 4a.

Referring to FIG. 13, the driven pulley 55 is in frictional contact with friction plate 2a and is so held by the washer 10, sleeve 11, and nut 9 which mates with bolt 7. Bolt 7 is, therefore, the shaft to which driven pulley 55 is rigidly connected so that the two rotate together. Friction plate 2a of FIG. 13 may rotate relative to shaft 7 and driven wheel 55 when the brake 12a is applied to the friction surface 13 of friction plate 2a. The brake 12a of FIG. 13 is operated by control cable 40, the same as the brake 12 of FIG. 12 was operated by cable 40. Thus, when control 36 is moved in the proper direction, both brakes 12, for both of the friction plates 2 (FIGS. 12 and 13), are applied at the same time.

Referring to FIG. 13, the bolt 7 is rigidly connected to free wheeling device 16 which is in turn connected to the rear wheel 51 to drive the same when the driven pulley 15 is driven forward. However, the free wheeling device 16, which is a ratchet of conventional construction, does allow the rider to rotate the pedals 53 in the opposite angular direction to the direction which moves the bicycle forward. In other words, if the pedals 53 are rotated clockwise (as shown in FIG. 1) the bicycle will be driven forward since all of the parts 54, 55, 16 and 51 are rotated clockwise. The freewheeling device 16, will, however, allow the pedals 53 of FIG. 1 to be rotated counter-clockwise a selected amount without substantially slowing the bicycle.

The slack adjuster for the V-belt 33 is shown in FIG. 16. The bicycle frame 23 supports arm 24 on which pulley 27 is mounted. Arm 25 is pivoted to arm 24 and carries pulley 28. Leaf spring 26 tends to rotate arm 25 clockwise to keep the belt 33 taut as shown in FIG. 1.

The modified form of slack adjuster of FIG. 18 works as follows: Member 91 is bolted at 90 to frame 23. Member 92 is pivoted at 93 to member 91. The V-shaped portion of V-belt 33 rides in the raceway of pulley 96 and the back side (flat side) of the V-belt 33 rides over pulley 95. Pulleys 95 and 96 are at opposite ends of an arm pivoted at 94 to member 92. The helical spring 97 pulls pulley 95 toward the right thus tending to move pulley 96 to the left; thus maintaining the belt tight.

In order that the belt 33 may be replaced, if necessary, the frame members 22 and 23 (FIGS. 1, 4 and 16) have forked ends 22a and 23a. The bolt 7 of FIGS. 13 and 15 passes between the arms of the forks 22a and 23a and is held in place by nuts such as nut 9. To change the belt 33, the nuts 9 are loosened and the rear wheel 51 with its bolt or axle 7 are slid out of the forks 22a and 23a. After the belt 33 has been replaced the bolt or axle 7 is slid back into the forks 22a and 23a and nuts 9 tightened.

FIGS. 19, 19A, 19B, 19C and 19D show a modified frame member for allowing the belt to be changed. Frame member 1759, 1760 corresponds to frame member 22 of FIG. 1. Frame member 1759, 1760 is in two pieces the ends of which are threaded to receive internally threaded sleeve 1700. Sleeve 1700 normally holds frame members 1759 and 1760 together, but on removal of sleeve 1700 the frame members 1759 and 1760 may be separated to permit changing the belt.

OPERATION

When the rider has the bicycle in its lowest transmission ratio and is rotating the pedals clockwise (FIG. 1) the bicycle moves along the roadway. If then the control 36 is moved to apply both of brakes 12 and 12a (FIGS. 12 and 13) and the forward pedaling continues, the brakes 12 and 12a will cause an angular motion to develop between friction plate 2a (FIG. 13) and driven pulley 55, and will also cause angular motion between friction plate 2 (FIG. 12) and driving pulley 54. In each case, the angular motion will rotate the pinions 17 driving the sections 3 of driving pulley 54 outward and driving the sections 3a of the driven pulley inward. Thus, the driving pulley will get larger and the driven pulley will become smaller; whereby the transmission ratio increases.

Let it now be assumed that it is now desired to reduce the transmission ratio, while the bicycle is moving forward at any speed. The rider momentarily operates control 36 to apply brakes 12 and 12a and at the same time rotates the pedals backwards (counterclockwise) as shown in FIG. 1. This causes each of the two friction plates 2 and 2a (FIGS. 12 and 13) to move angularly, relative to their respective pulleys, in the direction opposite to the direction that they moved when the rider increased the transmission ratio (see the paragraph immediately preceding the present paragraph of this specification). Thus, the pinions 17 will all move in the opposite angular direction that they moved when the transmission ratio was increased. The racks 5, 6 will all also move in the opposite directions from their earlier movements. Thus, sections 3 of the pulley 54 will move inward and sections 3a of pulley 55 will move outward.

The rider may find it desirable to make the changes in the transmission ratio in small steps or increments. This is done by applying the brakes 12 intermittently with each application being mementary.

I claim to have invented:

1. In a bicycle,
a front wheel,
a rear wheel,
rotatable means for driving the bicycle,
a driving pulley rotated by said rotatable means,
a driven pulley for rotating said rear wheel,
a belt connecting said driving and said driven pulleys,
at least one of said pulleys having an axis and a plurality of sections, each said section being spaced outwardly from said axis and shaped to receive said belt, and
control means operable to move said sections toward or away from said axis for changing the effective size of at least said one pulley.
said control means including a rack for each section, that moves its complementary section outwardly and inwardly, said control means also including pinions, one for each rack, for moving said racks,
said control means including a friction plate, contiguous with said one pulley, that normally is rotated by said one pulley,
said control means also including a brake under control of the rider of the bicycle for applying a braking actions to said plate.
said control means also including means responsive to any relative angular movement between said plate and said one pulley to rotate said pinions and move said racks.

2. In a bicycle,
a front wheel,
a rear wheel,
rotatable means for driving the bicycle,
a driving pulley rotated by said rotatable means,
a driven pulley for rotating said rear wheel,
a belt connecting said driving and said driven pulleys,
at least one of said pulleys having an axis of rotation and a plurality of first sections, each said section being spaced outwardly from said axis and shaped to receive said belt, and
first control means operable to move said first sections, radially, relative to said axis, for changing the effective size of such one pulley,
said first control means including a first friction element, contiguous with said one pulley, that normally is rotated by said one pulley,
said first control means also including a brake under control of the rider of the bicycle for applying a braking action to said element.
said first control means also including means responsive to any relative angular movement between said element and said one pulley to move said first sections radially with reference to said axis.

3. A bicycle as defined in claim 2, in which:
the other one of said pulleys having an axis of rotation and a plurality of section sections, each of which is spaced outwardly from said axis and shaped to receive said belt, and
second control means operable to move said sections, of said other pulley, radially, for changing the effective size of such other pulley.

4. A bicycle as defined in claim 3, comprising:
said second control means including a second friction element, contiguous with said other pulley, that normally is rotated by said other pulley,
said second control means also including a second brake under control of the rider of the bicycle for applying a braking action to said second friction element,
said second control means also including means responsive to any relative angular movement between said second friction element and said other pulley to move the sections of said other pulley radially.

5. A bicycle as defined in claim 4 in which said brakes have a common control operable by the rider of the bicycle.

6. A bicycle as defined in claim 5 in which said first control means and said second control means comprise means for increasing the size of one of said pulley and simultaneously decreasing the size of the other one of said pulleys when said brakes are applied simultaneously.

7. A bicycle as defined in claim 6 comprising means for maintaining said belt taut.

8. A bicycle as defined in claim 3 in which said second control means comprise means for moving said sections radially outward in response to said relative angular movement.

* * * * *